United States Patent [19]

Hardouin

[11] 4,099,434

[45] Jul. 11, 1978

[54] SAWING APPARATUS

[75] Inventor: Jean Pierre Hardouin, Luisant, France

[73] Assignee: Alcan Research and Development Limited, Montreal, Canada

[21] Appl. No.: 768,832

[22] Filed: Feb. 15, 1977

[30] Foreign Application Priority Data

Feb. 26, 1976 [GB] United Kingdom ............... 7729/76

[51] Int. Cl.² ................................................. B23Q 3/06
[52] U.S. Cl. ........................................... 83/157; 83/364
[58] Field of Search ............................. 83/157, 364

[56] References Cited

U.S. PATENT DOCUMENTS 3,222,970   12/1965   Hill ......................................... 83/157
3,811,353   5/1974    Miles ..................................... 83/157
3,910,142   10/1975   Jureit .................................... 83/364

Primary Examiner—Donald R. Schran
Attorney, Agent, or Firm—Cooper, Dunham, Clark, Griffin & Moran

[57] ABSTRACT

A sawing apparatus for sawing long lengths of material into shorter pieces having a predetermined length and discarding spoiled and short end pieces comprises a saw movable across a saw table formed in two parts which can be tilted independently of each other to tip sawn material into a receptacle. The downstream part has a nose piece projecting just beyond the saw to support the leading end of a length to be sawn. The apparatus also comprises exit and entry tables and a number of sensors for respectively detecting the leading and trailing ends of the lengths of material and for automatically initiating sequences of operations of releasable clamps for clamping the lengths of material, traversing movements of the saw, and the tiltable table parts.

5 Claims, 4 Drawing Figures

SAWING APPARATUS

This invention relates to sawing apparatus and has a particularly useful but not exclusive application in an apparatus for sawing batches of extruded lengths of metal into pieces of a predetermined length.

According to the invention there is provided sawing apparatus comprising a saw, and a saw-table across which the saw can be traversed, and which is formed in two parts extending respectively on opposite sides of the line of movement of the saw, each of said two parts being capable of being inclined independently of the other to tip material off that part.

According to a preferred feature of the invention the downstream part of the saw-table has a nose portion which is disposed a short distance on the other side of the saw at the general level of the table.

The apparatus preferably also comprises an entry table disposed upstream of and aligned with the upstream part of the saw table, an exit table disposed downstream of and aligned with the downstream part of the saw table, means for propelling parallel lengths of material in a downstream direction along the tables, a first sensor responsive to the arrival of the leading ends of said parallel lengths, a first releasable clamp arranged over the downstream end of the entry table for clamping the lengths of material against movement lengthwise of themselves, a second releasable clamp arranged over the downstream part of the saw table and close to the saw for clamping the lengths of material against movement lengthwise of themselves, the first sensor and the first clamp being a first predetermined distance downstream and upstream respectively of the saw, a stop disposed over the exit table at a second predetermined distance downstream of the saw for abutment with the leading ends of the parallel lengths, and a second sensor disposed upstream of the saw at a third predetermined distance greater than the sum of the first and second predetermined distances and responsive to the presence of the trailing end of the longest of the lengths of material.

In a preferred embodiment of the invention, the two said parts of the saw table are pivotable by their edges further from each other about respective horizontal axes.

One embodiment of the invention will now be described by way of example with reference to the accompanying diagrammatic drawings in which.

The illustrated apparatus is designed to saw extruded lengths of aluminium into pieces of predetermined shorter length, and to make allowance automatically for the fact that there is a spoiled end part at each end of each extruded length and for the fact that the lengths as extruded are generally not all of the same length.

The leading end of each extruded length is gripped by a gripper at the commencement of the extrusion process, and the gripper is moved away from the extrusion nozzle to maintain a small tension in the extruded length as the extrusion proceeds. At the conclusion of the extrusion process, the extruded length is stretched slightly by grippers which grip its opposite ends. When a group of extruded lengths has been accumulated, the lengths are moved to a sawing apparatus to be sawn into shorter pieces of a given length L.

Figure 1:
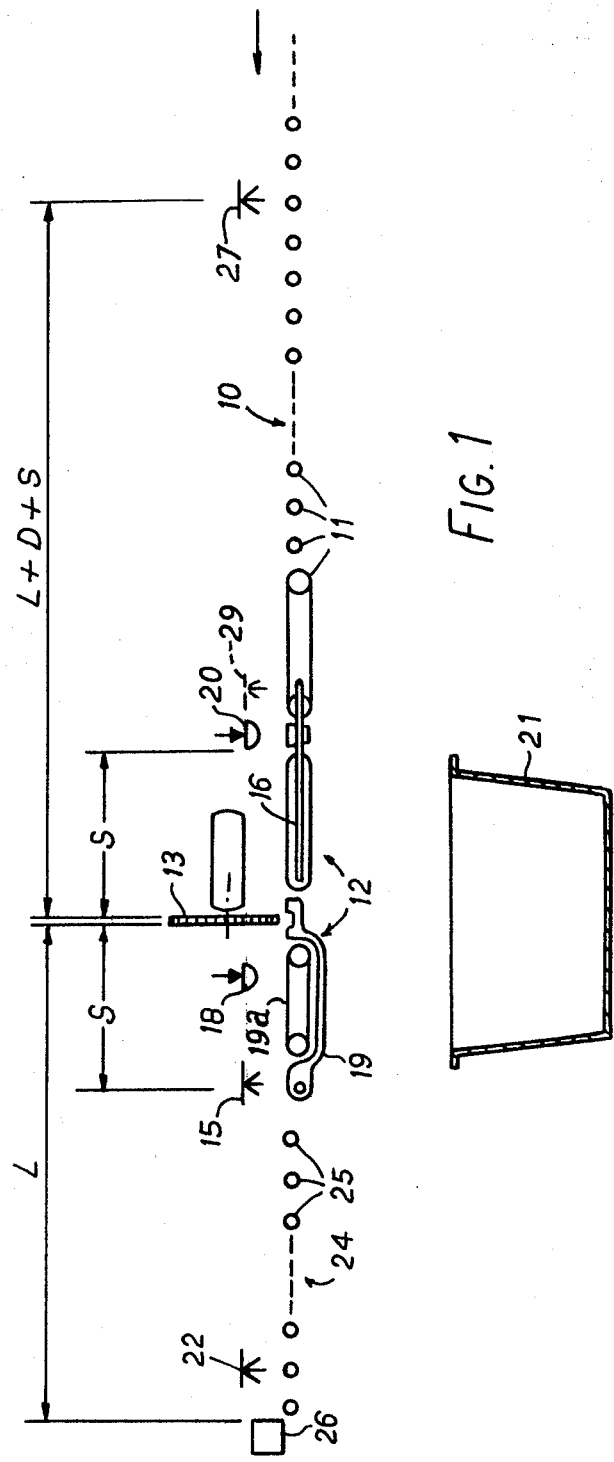
FIG. 1 illustrates the apparatus in general side view.
Figure 2:
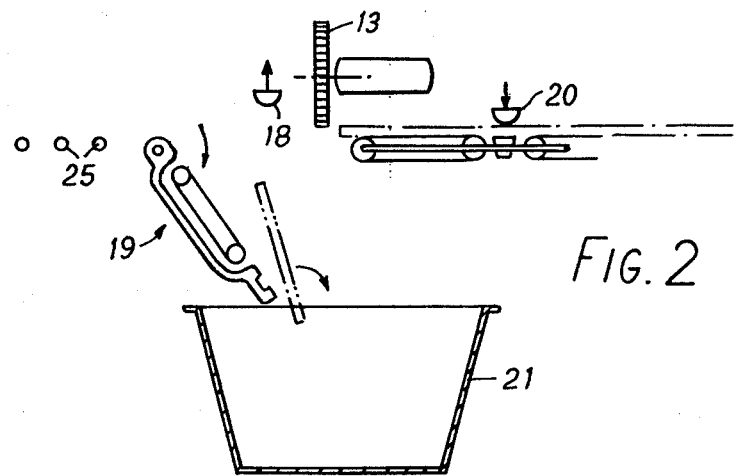
FIGS. 2, 3 and 4 illustrate the operation of the saw table.

Referring to FIG. 1, the lengths are placed side by side on an entry table 10 of the sawing apparatus with their leading ends in line. The entry table is formed by a conveyor and/or a series of driven rollers 11 which feed the extrusions over a saw table 12. The saw 13 is initially in its rest position at one side of the saw table. The saw table comprises upstream and downstream parts 16, 19 which are pivotally mounted about their edges furthest from each other for movement about respective horizontal axes, like trap-doors, and a scrap bin 21 is disposed below. The operation of the apparatus is controlled by first, second and third sensors 15, 27, 22 respectively. At the downstream end of the saw table the first sensor 15 is disposed and is energised at this time. Sensor 15 is triggered by the passage of the leading ends of the extrusions and initiates a sequence of operations. In the first of these operations the forward movement of the extrusions is stopped by stopping the rotation of the rollers 11, stopping a conveyor which constitutes the upstream part 16 of the saw table, and stopping a conveyor 19a which is incorporated in the downstream part 19 of the saw table. The second operation is the actuation of a first clamp 20 which is disposed between the downstream end of the entry table 10 and the upstream end of the saw table and which operates to clamp the extruded lengths against movement, and of a second clamp 18 to clamp the extrusion to the downstream part 19 of the saw table at a position close to the saw. The distance S between the saw and sensor 15 is so selected that in the next operation of the sequence, the traversing movement of the saw cuts off the spoiled leading ends of the extruded lengths. The saw returns to its starting position and clamp 18 is released. The downstream part 19 of the saw table is now released in the next operation in the sequence to swing downward to tip the sawn-off leading ends of the extruded lengths into the bin 21 (see FIG. 2) and is subsequently returned to its original position. In the final operations in this sequence, the sensor 15 is deenergised, the third sensor 22 is energised, the clamps 18 and 20 are released, and the drives of the conveyor constituting the upstream part 16 of the saw table, the conveyor 19a and the rollers 11 are re-started.

An exit table 24 constituted by further driven rollers 25 extends downstream from the downstream end of the saw table, the forward movement of the extruded lengths over the exit table being checked by an abutment 26 which is disposed at distance L from the saw. The third sensor 22 is a short distance upstream of the abutment 26 and is triggered by the aligned leading ends of the extruded lengths to actuate a second series of operations. Firstly in this series, the driving motors of the rollers 11 and 25, conveyor 19a and the conveyor part 16 are slowed and stopped to bring the leading ends of the extruded lengths against the abutment 26 without rebound. The working and return movements of the saw are then actuated, the resulting cut lengths L are removed from the exit table in any convenient way, and the forward movement of the extruded lengths is restarted. This second sequence of operations is repeated, cutting the extruded lengths into lengths L, until the second sensor 27 on or adjacent the entry table detects the trailing end of the longest of the extruded lengths.

Although the extruded lengths are formed from similar billets of metal, the extruded lengths vary for a number of reasons, but experience shows that there is a maximum difference D in length between the longest and shortest in any batch of extruded lengths. This maximum difference, which is ascertained in advance of setting the sawing apparatus, may for example be 2 metres. There is also a minimum length S at each end of each extrusion which must be scrapped to ensure that the end portions which have been spoiled by the grippers during the extrusion process or the subsequent stretching of the extrusion are scrapped. This length S should not, where practicable, exceed the maximum length of extrusion which can be accommodated by the scrap handling system. The distance between sensor 15 and the adjacent face of the saw and the distance between clamp 20 and the adjacent face of the saw are both set at S.

Figure 3:
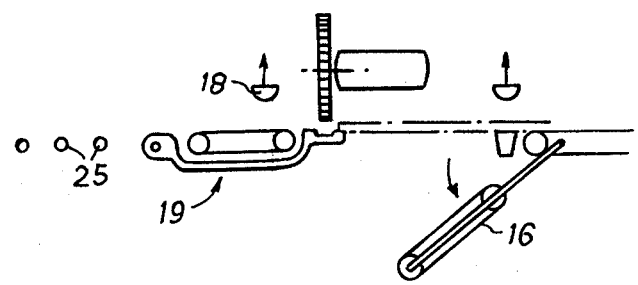

For reasons which will become clear, the second sensor 27 is placed a distance L+D+S from the adjacent face of the saw. The actuation of the second sensor 27 means that although the longest extruded length is long enough to allow a piece of length L to be cut from it, there may be in the batch one length which is shorter by a length D which is therefore marginally too short for a piece of length L to be cut from it, since the trailing end part of length S or less of each extrusion has been spoiled by the gripper either in the extrusion process or in the stretching process. Actuation of the sensor 27 therefore sets in motion a sequence of operations to cut all the remaining parts of the extruded lengths into pieces of length S. In this sequence the first sensor 15 is energised and stops the forward feed of the extruded lengths when actuated by the passage of their leading ends, so that a length S of the extrusions projects beyond the saw. Sensor 15, when actuated, operates clamps 18 and 20 to clamp the extrusions followed by a traverse and return movement of the saw, then the release of clamp 18, then the operation of exit part 19 of the saw table to tip the cut lengths into the scrap bin (see FIG. 3), followed by operation of the entry part 16 of the saw table to tip into the scrap bin any length of any extrusion not held by the adjacent clamp 20.

Figure 4:
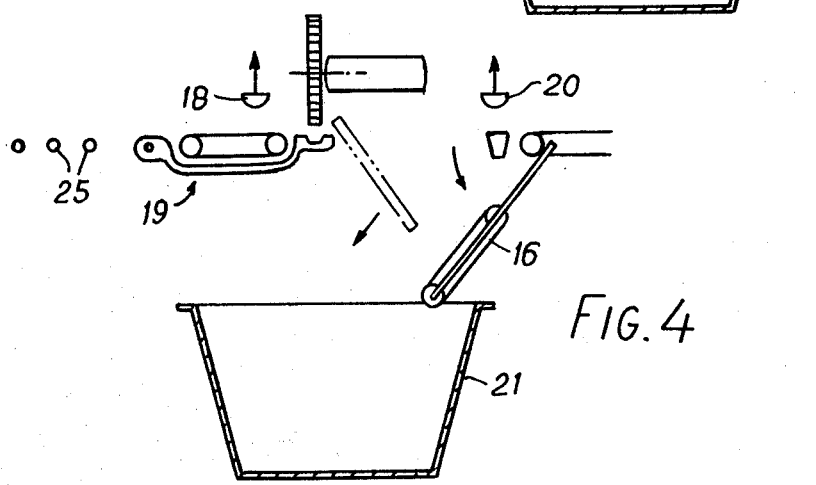

In order to ensure that any remaining extruded length slightly in excess of S and having its trailing end held by clamp 20 is positively retained at the entry side of the saw table, the nose portion of the exit part 19 of the saw table projects beyond the saw so that the leading end of the said extruded length is carried on the nose portion (see FIG. 4) and does not hang down at an angle from clamp 20 and become trapped or wedged between the forward ends of the two parts 16, 19. The gap between the nose ends of the two parts 16, 19 when the exit part 19 is in its dropped position should be greater than S.

Eventually, no further material arrives to trigger sensor 15, so that the cycle is interrupted and a signal is given, e.g. after a predetermined interval of time, for a new batch of extruded lengths to be placed on the entry table.

If the lengths of the spoiled portion at the leading end of the extrusion exceeds S then the sequence initially actuated by sensor 15 would have to be modified to maintain sensor 15 energised, so that a second length S would be cut from the leading ends and scrapped before cutting into lengths L was commenced.

Since the driven entry part 16 of the saw table cannot extend up to the saw blade, there is the possibility that the entry part would, in the case of a last scrap length having a length slightly greater than S (e.g. S+1cm.) fail to drive the leading end of the scrap length far enough to actuate operation of the first sensor 15, which would therefore give a signal indicating, falsely, that the machine was clear of sections. The scrap length remaining on the exit part 19 of the saw table would then foul the next batch of sections fed past the saw. This problem is overcome in the illustrated arrangement by making the exit part 19 of the saw table, or a part of it, in the form of a driven conveyor 19a, as in the case of the entry part 16.

Alternatively, a fourth sensor can be located adjacent the clamp 20, as indicated in broken lines at 29 in FIG. 1, to detect the trailing ends of lengths shorter than those capable of being driven to sensor 15, for example lengths shorter than S + 10cm. Actuation of this fourth sensor would indicate the end of the sawing cycle, and would be arranged to actuate tilting of both tables 1 and 2 to eject into the scrap bin any lengths remaining on the saw table. Since this latter solution could give scrap up to 10 cm in excess of length S, the scrap disposal system would have to be capable of handling these slightly longer lengths.

I claim:

1. Sawing apparatus comprising a saw, a saw table across which the saw can be traversed, and which includes first and second parts extending respectively on opposite sides of the line of movement of the saw, means for inclining each of said two parts independently of the other to tip material off that part, and a releasable clamp at the same side of said line of movement of the saw as said first saw table part for clamping the lengths of material against movement lengthwise of themselves, the said second saw table part having a nose portion which projects a short distance on said same side of the line of movement of the saw at the general level of the table.

2. Sawing apparatus as claimed in claim 1, wherein the saw table further comprises an entry table disposed upstream of and aligned with said first saw table part, an exit table disposed downstream of and aligned with said second saw table part, means for propelling parallel lengths of material in a downstream direction along the tables, a first sensor responsive to the arrival of the leading ends of said parallel lengths, said first-mentioned releasable clamp being arranged over the downstream end of the entry table for clamping the lengths of material against movement lengthwise of themselves, a second releasable clamp disposed close to the downstream side of the saw for clamping the lengths of material against movement lengthwise of themselves, the first sensor and the first clamp being a first predetermined distance downstream and upstream respectively of the saw, a stop disposed at a second predetermined distance downstream of the saw for abutment with the leading ends of the parallel lengths, and a second sensor disposed upstream of the saw at a third predetermined distance greater than the sum of the first and second predetermined distances and responsive to the presence of the trailing end of the longest of the lengths of material.

3. Sawing apparatus as claimed in claim 2, comprising a third sensor which is disposed upstream of the stop and which is adapted to be actuated by the presence of the leading ends of the lengths of material and when so actuated to cause the propelling means to slow and then stop the forward movement of the lengths such that the said leading ends abut the stop without rebounding.

4. Sawing apparatus as claimed in claim 1, wherein at least one of said parts of the saw table incorporates driving means for driving material thereon in a downstream direction.

5. Sawing apparatus as claimed in claim 1, wherein the two said parts of the saw table are pivotable by their edges further from each other about respective horizontal axes.

* * * * *